United States Patent [19]

Lambrou

[11] 3,715,520

[45] Feb. 6, 1973

[54] TELEPHONE DIALING APPARATUS

[76] Inventor: Nicholas S. Lambrou, 35 Devereaux Street, Arlington, Mass. 02174

[22] Filed: Dec. 1, 1971

[21] Appl. No.: 203,569

[52] U.S. Cl. ..............179/90 A, 240/2.17, 179/90 L, 179/81 C, 179/84 L

[51] Int. Cl. ..............................................H04m 1/45

[58] Field of Search....179/90 R, 90 A, 90 AD, 90 C, 179/90 AN, 90 AT, 81 C, 84 L; 240/2.17

[56] References Cited

UNITED STATES PATENTS

| | | | |
|---|---|---|---|
| 3,064,081 | 11/1962 | Tjeder | 179/84 |
| 3,585,303 | 10/1968 | Chieffo | 179/84 |
| 2,675,463 | 4/1954 | McClure | 240/2.17 |

*Primary Examiner*—Kathleen H. Claffy
*Assistant Examiner*—Kenneth Richardson
*Attorney*—Wolf, Greenfield & Sacks

[57] ABSTRACT

An accessory for a telephone to assist in the dialing of the digits of the telephone dial includes a housing that partially covers the telephone and has an opening therein through which the dial may be observed, an array of lights preferably disposed in a semi-circle about the dial with one light associated with each digit of the dial, and a stepping switch responsive to each dialing of the dial for stepping the stepping switch. The apparatus employs a code card having two sets of connectors that are interconnected in a predetermined pattern to identify an entire telephone number. This code card is coupled between the stepping switch and the light array and is adapted to control the successive illumination of the lights in a sequence corresponding to the telephone number and with one light being illuminated at a time associated with one digit which digit is the next one to be dialed.

20 Claims, 10 Drawing Figures

TELEPHONE DIALING APPARATUS

FIELD OF THE INVENTION

The present invention pertains in general to a telephone dialing apparatus for assisting in the dialing of the digits of the telephone dial. More particularly, this invention is directed to an accessory for a telephone to assist in dialing wherein an array of lights are associated with the dial, one light being associated with each dialing digit, and each light is sequentially illuminated in a preselected sequence corresponding to a predetermined telephone number. When each digit corresponding to an illuminated light has been dialed, the light corresponding to the next digit to be dialed is then illuminated and the sequence continues until the entire number has been dialed.

BACKGROUND OF THE INVENTION

There have been developed various types of accessories for a telephone to assist a person in dialing the correct number. Most of these devices are essentially entirely mechanical and use some type of a card that has the telephone number written thereon. In one known patent, namely U.S. Pat. No. 3,107,278 a card is inserted over the telephone dial and is successively rotated to expose the next number to be dialed after each number has been dialed.

One of the drawbacks associated with this type of a device is that when a card has been used many times the indicia thereon are sometimes not clearly legible. Also, the device must be properly aligned or the pointer that selects the next number may point in between numbers or to the wrong number. Also, as these devices are essentially entirely mechanical they are more susceptible to fault problems than would an electrical or electro-mechanical arrangement.

In addition, certain segments of our society such as the retarded, aliens, psychiatric patients, aged people, and particularly individuals with impaired vision find it extremely difficult to operate these known devices. Partially blind people, for example, could not read a card with indicia on it but they could discern an illuminated light adjacent a digit to be dialed. Also, some handicapped people cannot identify a telephone number as corresponding to a particular person or group such as the fire department. Thus, other means, such as a photograph of the person to be called or a graphic scene associated with the telephone number would make it easier for the person to select the correct card for dialing.

Still another problem associated with these known dialing aids is that once a card has been fabricated with a telephone number thereon it is usually not reusable but another card has to be made when a new telephone number is to be added to the list of numbers to be dialed in the same manner. With the apparatus of the present invention code cards can be reused by simply interconnecting wires on the card differently. Thus, if a person moves from one town to another telephone numbers for emergency services generally change and the code cards can be simply altered without having to use new code cards.

OBJECTS OF THE INVENTION

Accordingly, it is a primary object of the present invention to provide an improved telephone dialing apparatus for assisting a person in the dialing of a telephone number.

Another object of the present invention is to provide a telephone dialing aid that uses indicator lights one of which is illuminated at a time to indicate the next digit to be dialed. The present invention obviates some of the previously mentioned problems in that there is no card that need be used having the telephone indicia printed thereon.

A further object of the present invention is to provide a telephone dialing aid including sequencing means and a code card having connector means so intercoupled to cause the sequencing means to illuminate indicating lights, one at a time, and in a sequence corresponding to a telephone number. The present invention also obviates some of the foregoing problems by providing a code card that is very easily alterable and can be rewired for a new telephone number quite easily.

Still another object of the present invention is to provide a telephone dialing aid having a code card with an identifying photograph, graphic scene or the like affixed thereto. The photograph could be the picture of the person corresponding to the telephone number for the card or could be some other scene that would be easily identifiable by the person using the apparatus of the present invention. Card identification could also be provided for the partially blind, for example, by using indentations in the card on one edge that would be interpretable by the feel of the person.

Still a further object of the invention is to provide a telephone dialing aid in accordance with the principles of the present invention as set forth herein and that is simple in construction, very versatile, compact, and inexpensive to fabricate.

SUMMARY OF THE INVENTION

To accomplish the foregoing and other objects, the telephone dialing apparatus of the present invention comprises a housing at least partially enclosing the telephone but exposing the telephone dial, an array of lights, one being associated with each digit of the dial, a sequencing means responsive to each dialing of the dial, and a code card intercoupled between the light array and the sequencing means. The light array is preferably disposed in a semi-circular arrangement about the dial and the shifting means is preferably a stepping switch which is responsive to actuation of an actuator associated with the telephone dial.

In a preferred embodiment the code card has two sets of connectors one set of which connects to the indicator lights and the other set of which connects to the stepping switch when the code card is inserted in place in the apparatus. The sets of connectors are interconnected in a manner corresponding with a particular predetermined telephone number so that upon insertion of the code card the light associated with the first digit to be dialed is first illuminated and after the dialing of each digit the next successive light associated with the next digit is then illuminated until the entire number has been dialed.

BRIEF DESCRIPTION OF DRAWINGS

Numerous other objects, features and advantages of the invention should now become apparent upon a reading of the following detailed description when considered in conjunction with the appended drawings in which.

DETAILED DESCRIPTION

Figure 1:
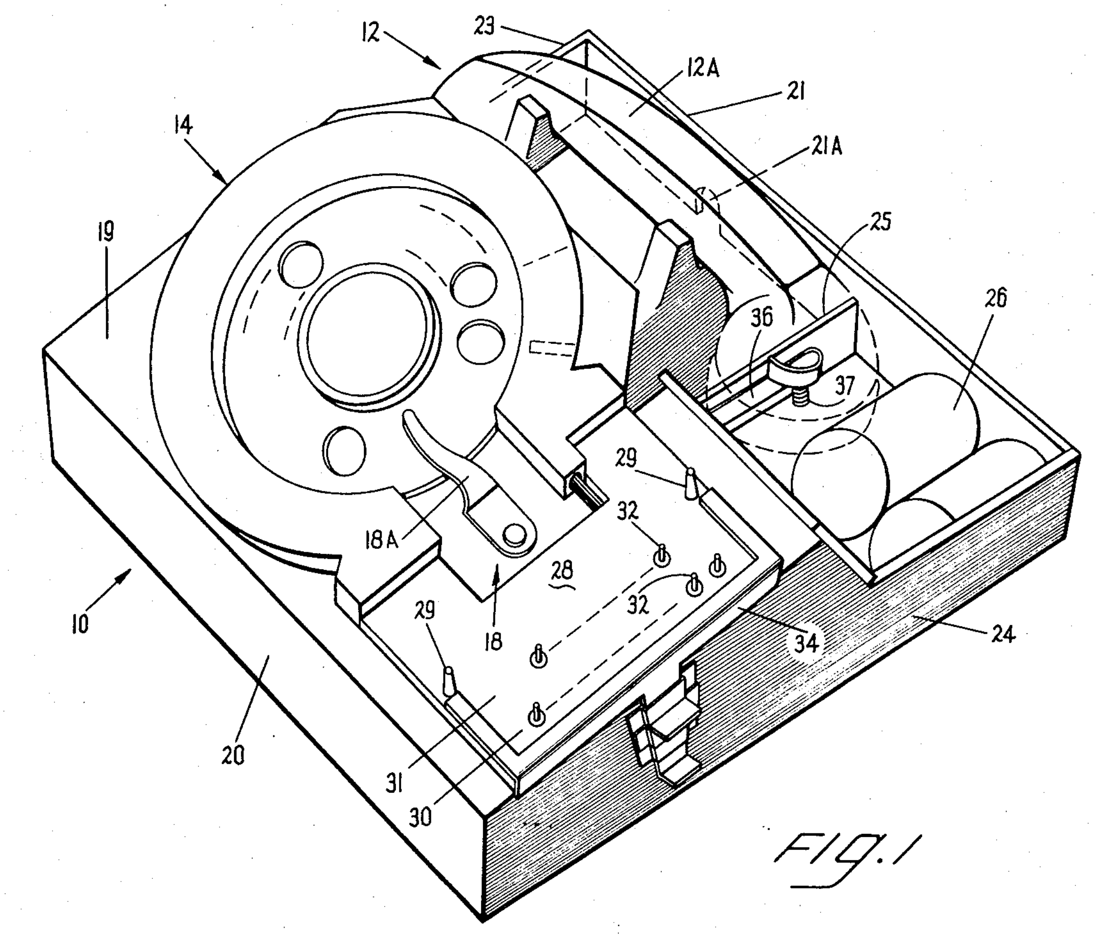
FIG. 1 is a perspective view of a preferred embodiment of the telephone dialing apparatus of the present invention showing a typical telephone receiver but not showing the code card.

Referring now to the drawings and in particular to FIG. 1, there is shown a preferred embodiment of the majority of the telephone dialing apparatus of the present invention comprising a housing 10 which is placed over the telephone 12, a light array 14, a stepping switch 16 (not shown in FIG. 1), and an actuator 18.

The housing 10 includes a front wall 20, a back wall 21, and a pair of side walls 23 and 24. An intermediate wall 25, along with walls 20, 21 and 23 define a compartment for telephone 12 which is open at the bottom so that it may fit over the telephone. An opening (not shown) may be provided in the back wall 21 to accommodate the telephone cord. A similar opening may also be provided in wall 23 to accommodate the cord of the telephone receiver 12A. A compartment is defined between side wall 24 and intermediate wall 25 for containing the stepping switch and batteries 26. The housing 10 has a slanted facing wall 19 having light array 14 secured thereto, as well as male connector plate 28. Both light array 14 and plate 28 may be secured to wall 19 by screws or glue or, alternatively, they may be integrally formed therewith.

The housing 10 may be fabricated of a plastic material in a variety of different colors and may be fabricated either in an essentially single unit or may be fabricated in pieces and then assembled. The light array 14 is preferably fabricated of a clear solid plastic having 10 indicator lights disposed therein, and being secured to face 26 of the housing 10 in a suitable manner. The details of light array 14 are discussed in more detail hereinafter with reference to FIG. 2.

Figure 5:
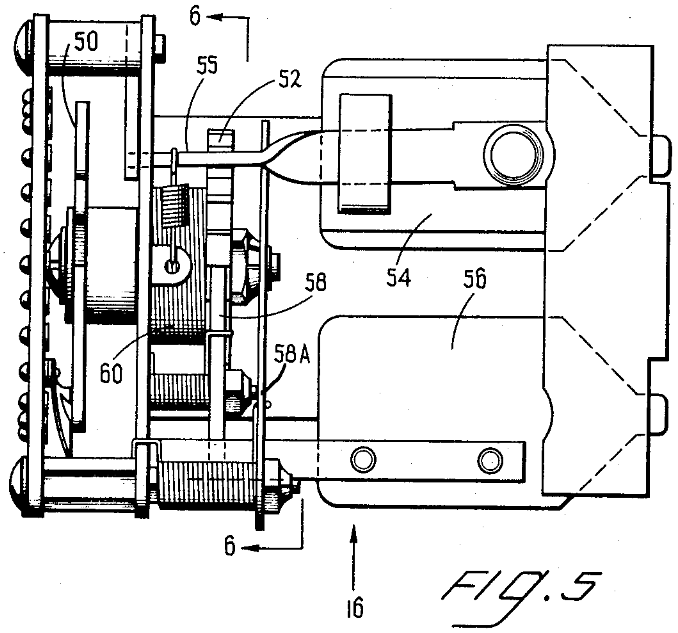
FIG. 5 shows a front view of the stepping switch used in the apparatus of the present invention.

The actuator 18 shown in FIG. 1 includes an elongated arm 18A that extends into the path of dialing. The facing wall 19 is provided with an aperture to accommodate part of actuator 18 that extends inside housing 10. FIG. 5 shows actuator 18 of FIG. 1 in more detail.

Figures 2, 3:
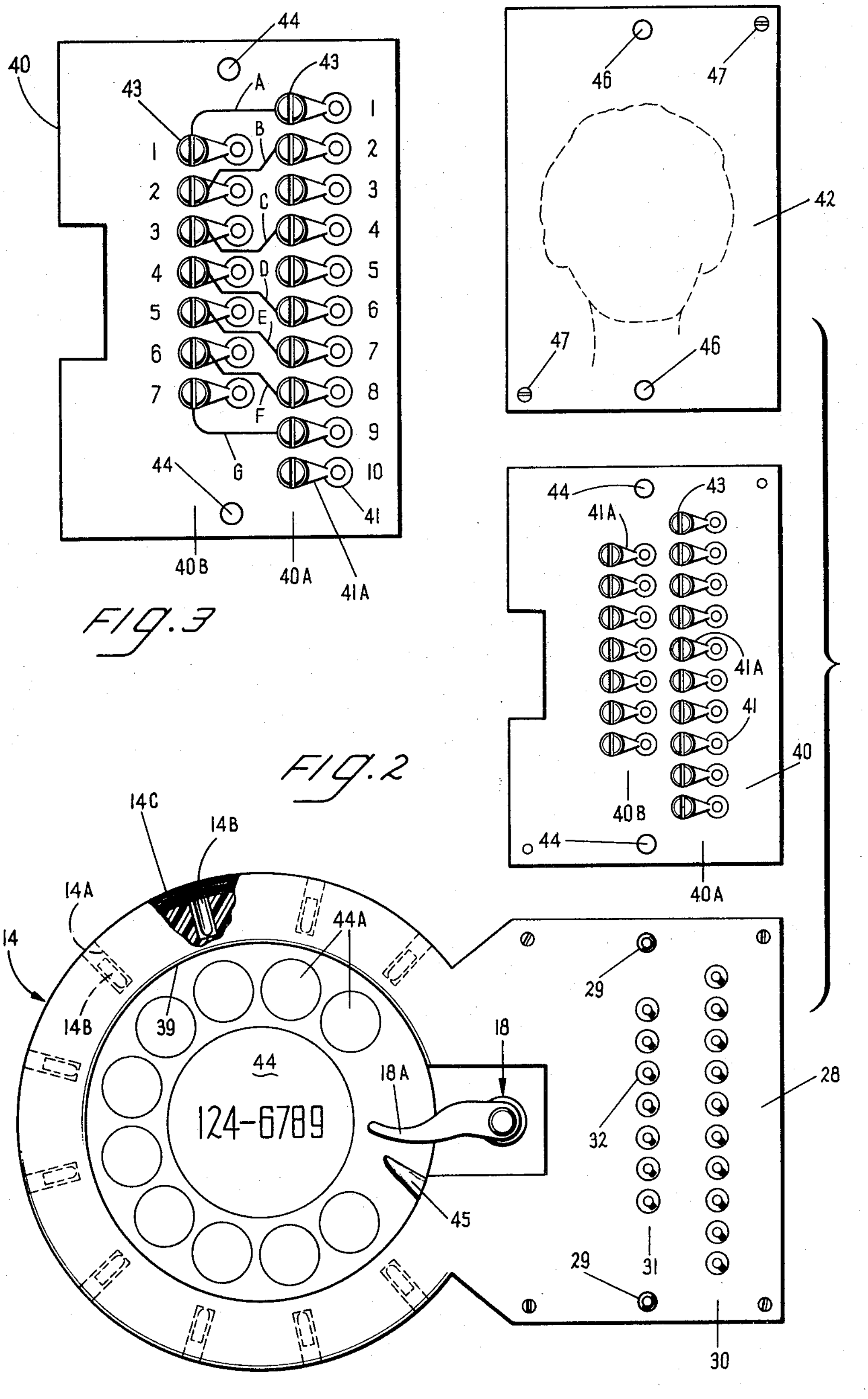
FIG. 2 is a plan view showing the telephone dial and associated male connector plate, the code card, and a photograph or other picture that may be associated therewith.
FIG. 3 is a plan view of the code card shown in FIG. 2 but also indicating the interconnecting jumpers used for one predetermined telephone number.

The male connector plate 28 includes a pair of aligning posts 29 for aligning the code card which is shown and discussed in more detail in FIGS. 2 and 3. The male connector plate 28 includes first and second rows 30 and 31, respectively, of fixed prongs 32 which extend from the top surface of plate 28. The prongs 32 extend through plate 28 and the ends of the prongs under plate 28, which are not shown in FIG. 1, connect by wires to the stepping switch. These connections are discussed in more detail hereinafter with reference to FIG. 4.

FIG. 1 also shows the ejector 34 which is used to eject a code card after it has been placed on the male connector plate 28 and is no longer to be used. The details of the ejector 34 are discussed hereinafter with reference to FIG. 8.

FIG. 1 shows a reset arm 36 which is biased upwardly by a spring 37 when the telephone receiver 12A is raised from the telephone. When the receiver is returned to the telephone, the reset arm 36 is moved against the bias of spring 37 to reset the stepping switch as discussed in more detail hereinafter with reference to FIG. 8.

Referring now to FIG. 2 there is shown a plan view of the light array 14, the male connector plate 28, code card 40, and associated picture 42. As previously indicated, the face wall 19 of housing 10 has the light array 14 secured thereto and has a central aperture 39 for accommodating the dial 44 of a conventional telephone. The dial 44 conventionally includes 10 apertures 44A which correspond to 10 discrete positions of the dial and which are normally selected by the operator's finger and rotated to dial a desired number. The dial 44 also has a stop 45 conventionally associated therewith. In dialing a number the operator dials until his finger hits against stop 45 and then the dial 44 is allowed to be released. It is noted that the actuator arm 18A is inserted prior to the stop 45 so that the actuator 18 is actuated upon the dialing of each digit of a number.

The light array 14, as previously indicated, may be constructed of a plastic that is solid and approximately three-eighths inch thick. A plurality of apertures 14A may be drilled in light array 14 at equally spaced intervals, and a plurality of bulbs 14B, which are preferably incandescent bulbs, may be inserted in each of the apertures. It is noted that once the bulbs 14B are inserted they align with the corresponding apertures 44A of dial 44. Thus, when one of the lamps is illuminated the digit that it essentially points to is the next one to be dialed. FIG. 2 shows a partial cross-section about one of the bulbs 14B, also showing a group of wires 14C one of which connects to each of the lights 14B of light array 14 and including a single return wire. To accommodate wires 14C the edge of light array 14 may have a circular channel for containing the wires. Various other means may be used for connecting the bulbs 14B to appropriate prongs of male connector plate 28. The schematic diagram of FIG. 4 which is discussed in more detail hereinafter shows the exact connections from each of the bulbs 14B to the prongs of male connector plate 28.

The male connector plate 28, as previously indicated, includes two rows of connectors or prongs 30 and 31, respectively, each including a plurality of prongs 32. Row 30 contains 10 such prongs whereas row 31 contains seven. The number 10 corresponds to the 10 possible digits that can be dialed, and, in the embodiment shown, the seven prongs in row 31 correspond to the seven digits of a typical telephone number. FIG. 2 also shows the aligning posts 29 extending from plate 28.

FIG. 2 shows the female code card 40 which includes two rows of connectors 40A and 40B containing, respectively, 10 and seven contacts per row. Each contact includes a metal eyelet 41 which extends through the card 40, is preferably peened over on both sides of the card, and connects by conductive bridge 41A to a terminal lug 43 to which a jumper may be connected. The terminal lug screws into card 40 and when a jumper is placed thereunder electrical contact is made from the jumper to eyelet 41. Code card 40 also includes apertures 44 which should fit over posts 29 to align the code card 40 with the male connector plate 28. When the code card 40 is inserted over the male connector plate 28 each of the eyelets 41 fit over and mates with the corresponding prongs 32 of plate 28.

FIG. 2 also shows a photograph 42 which may be affixed to a plastic backer, and includes apertures 46 which align with apertures 44 of code card 40. A pair of securing screws 47 may be used to secure the photograph 42 to the code card 40 so that the two provide a single card. The picture 42 actually covers the contacts of code card 40 but may be removed to change the jumper arrangement.

FIG. 3 shows a code card 40 slightly larger than the one shown in FIG. 2 including connector rows 40A and 40B and aligning apertures 44. In FIG. 3 the eyelet connectors of row 40A are numbered 1–10 and the eyelet connectors of row 40B are numbered 1–7. If the telephone number that is to be used with the code card is, for example, 124-6789, then the jumper connections of FIG. 3 are the appropriate ones. Thus, the first connector of row 40B couples to the first connector of row 40A by means of jumper A, the second connector of row 40B couples to the second connector of row 40A by means of jumper B, the third connector of row 40B couples to the fourth connector of row 40A by means of jumper C, the fourth connector of row 40B couples to the sixth connector of row 40A by means of jumper D, the fifth connector of row 40B couples to the seventh connector of row 40A by means of jumper E, the sixth connector of row 40B couples to the eighth connector of row 40A by means of jumper F, and the seventh connector of row 40B couples to the ninth connector of row 40A by means of connector G. The particular interconnection of the jumpers A–G of FIG. 3 will be more clearly understood after a consideration of the circuit diagram of FIG. 4.

Figure 4:
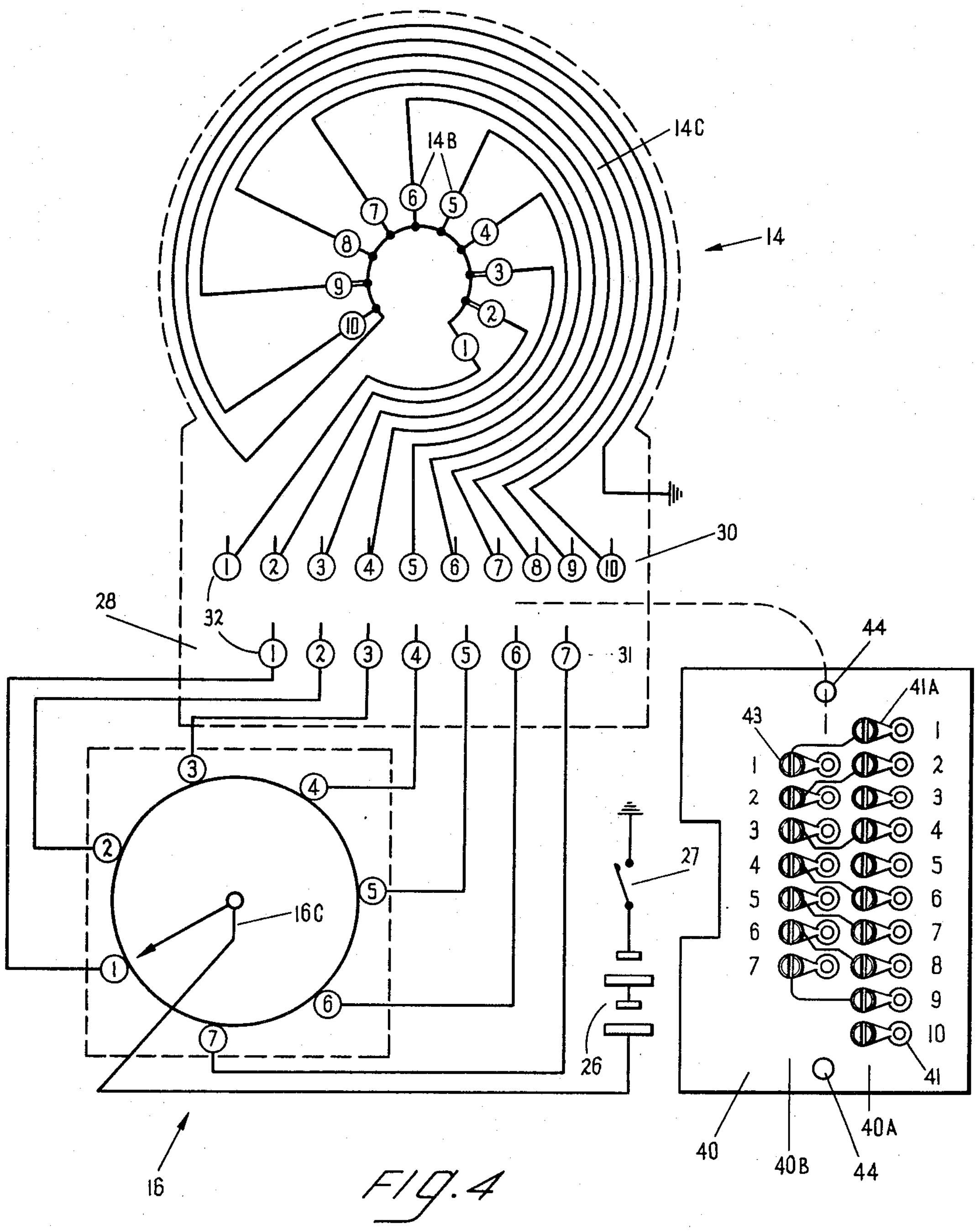
FIG. 4 is a schematic diagram of the circuitry used with the apparatus of the present invention including a stepping switch, a light array, and a code card.
Figures 7, 8, 9, 10:
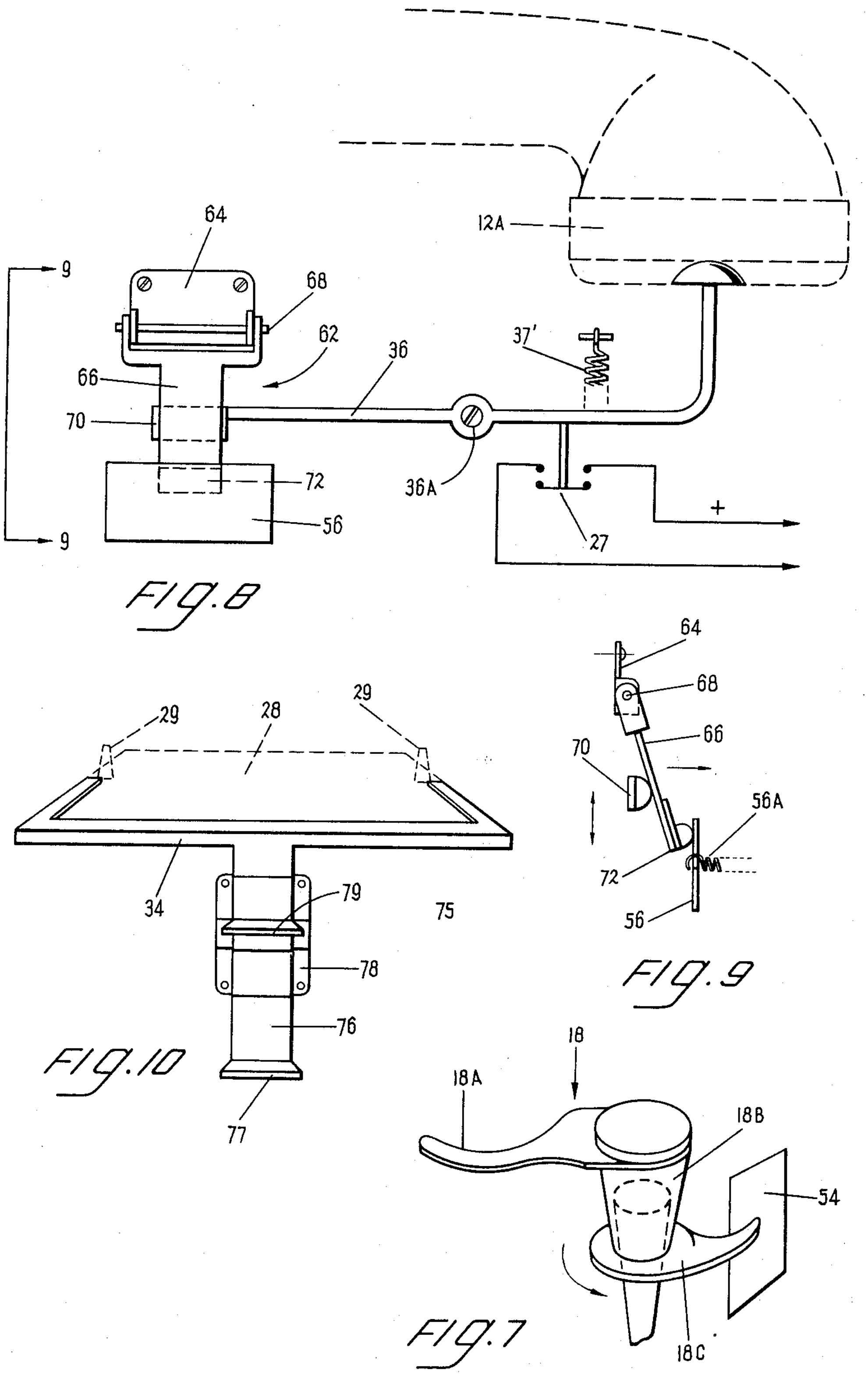
FIG. 7 is a partial perspective view of the actuator shown in FIG. 1.
FIG. 8 shows means for resetting the stepping switch when the telephone receiver is resting on the telephone.
FIG. 9 is a side view taken along line 7—7 of FIG. 6 and showing the operation of the means for resetting the stepping switch in somewhat more detail.
FIG. 10 shows in somewhat more detail the means for ejecting a code card shown in FIG. 1.

FIG. 4 shows a schematic diagram of the circuitry associated with the telephone dialing apparatus of the present invention including the code card 40 with associated jumpers, light array 14, and stepping switch 16. The schematic diagram of the stepping switch 16 shows seven discrete positions. However, the stepping switch may include other positions which are essentially not used. The common contact 16C of stepping switch 16 couples to one side of battery 26. The other side of battery 26 couples by way of switch 27 to ground. One side of each of the lamps 14B also couple to ground. The switch 27 is in its open position as shown when the telephone receiver 12A is in place on the telephone 12, thus interrupting power of the stepping switch 16. When the telephone receiver 12A is lifted from the telephone, switch 27 closes (see FIG. 8) and the stepping switch may now be operated by depressing actuator 18. FIG. 8 shows an actual embodiment for switch 27.

The output terminals of stepping switch 16, which total seven connect by conductive wire to the prongs 32 at the underside of male connector plate 28. The connecting points are illustratively numbered 1–7 in FIG. 4 and are arranged in row 31. Row 30 of male connector plate 28 contains 10 prongs or connector terminals which couple to their associated lamps 14B by way of wire group 14C.

When code card 40 is inserted on male connector plate 28 with the particular interconnector shown in FIG. 4, the telephone number 124-6789 is successively illuminated as the stepping switch 16 moves from position to position. When the stepping switch is in the position shown, namely position 1, a battery voltage is coupled by way of the stepping switch, from the first connector of row 31 to the first connector of row 30 and from there to the first lamp 14B of light array 14. As each number is dialed the actuator 18 is actuated, causing the stepping switch 16 to move to its next position which in turn causes the next lamp 14B to be illuminated indicating the next digit of the telephone number to be dialed.

Figure 6:
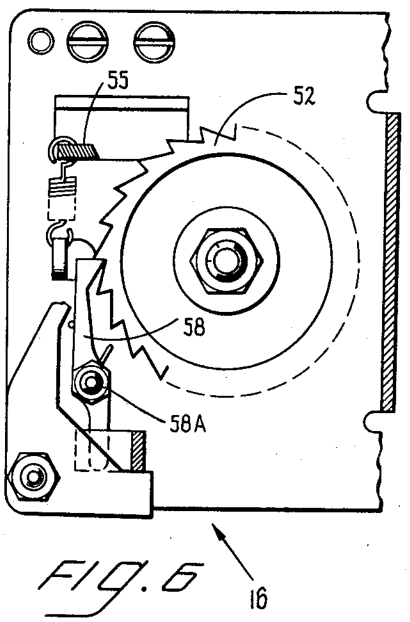
FIG. 6 is a side view of the stepping switch of FIG. 5 with part of the mechanism removed.

The stepping switch shown in FIG. 4 may be of conventional design, and one particular stepping switch is shown in FIGS. 5 and 6 in front and side views, respectively. The stepping switch 16 in the embodiment shown is stepped mechanically and includes a rotating switch 50 directly coupled to a gear 52 which is sequentially rotated by depression of plate 54. Plate 54 has a lever 55 extending therefrom which rotates gear 52 one turn for each depression of plate 54. The switch 16 also includes a reset plate 56 which couples to pawl 58. When the reset plate 56 is depressed the pawl 58 is pivoted about pin 58A and the pawl is lifted. Gear 52 and consequently switch 50 is allowed to return to its initial position by means of spring 60 which biases the gear 52 to its initial position. The operation of the plates 54 and 56 is discussed hereinafter with reference to FIGS. 7–9.

Referring now to FIG. 7 there is shown the actuator 18 which includes an elongated arm 18A which extends across the path of dialing and a shaft 18B which is suitably supported at both ends within the housing 10. An eccentric 18C is fixed to the shaft 18B and upon movement of the arm 18A eccentric 18C bears against plate 54 of stepping switch 16 to cause movement of the stepping switch to the next position, and in turn illumination of the next indicator lamp. When the plate 54 is depressed the gear 52 shown in FIG. 6 is rotated and the switch 50 moves to its next contacting position.

Referring now to FIGS. 8 and 9 there is shown means for resetting the stepping switch 16 and for interrupting power to the stepping switch when the receiver 12A is on the telephone 12, as indicated in FIG. 8. The weight of receiver 12A causes arm 36 to pivot about pivot point 36A causing switch 27 to open against the bias provided by spring 37'. In the embodiment of FIG. 8 the spring 37' is mounted above arm 36 and normally (receiver lifted) biases arm 36 in a counterclockwise direction so that switch 27 is normally closed providing power to the stepping switch 16.

The arrangement of FIG. 8 also includes a hinge member 62 which generally comprises a bracket 64 secured to the housing 10 preferably from wall 25, and a pivot member 66 which pivots about pivot point 68. The arm 36 includes a cam end 70 which moves upwardly when the receiver 12A is placed on the telephone thereby causing pivot member 66 to move outwardly at its bottom end 72. When this occurs the bottom end 72 bears against plate 56 causing a lifting of pawl 58 (see FIG. 6) and a resetting of the stepping switch 16 to its initial position. A spring 56A is preferably associated with plate 56 for biasing the plate normally in a non-resetting position.

When the receiver 12A is lifted from the telephone to dial a number the plate 56 is no longer held reset, and the switch 27 is closed providing an energy path to the stepping switch. When a code card 40 is inserted over the male connector plate 28 and the receiver 12A is removed from the telephone, the first lamp 14B corresponding to the first digit of the telephone number is illuminated. As the actuator 18 is depressed the stepping switch sequences one position at a time and each lamp in sequence is illuminated until all of the numbers have been dialed.

Referring now to FIG. 10 there is shown the ejector 34 which has been previously shown in FIG. 1. Ejector 34 includes a U-shaped upper portion 75 which extends about the edge of connector plate 28. The ends of member 75 terminate near to the aligning posts 29. Ejector 34 also includes a downwardly extending base portion 76 having a vertically extending tab 77 extending therefrom. A slide member 78 is secured by suitable means to the side of housing 10 at wall 24 and defines a channel for base portion 76. Member 78 also has a vertically extending tab 79. Once the code card 40 has been inserted over the male connector plate 28 and is no longer to be used the tabs 77 and 79 of ejector 34 are pushed towards each other causing the base portion 76 to slide in the channel of slide member 78. This causes the U-shaped portion 75 to move upward to remove the code card 40 from the apparatus.

Having described a preferred embodiment of the present invention it is contemplated that many modifications can be made thereto all of which should fall within the scope of this invention. For example, a different stepping switch and code card can be used when 11 digit numbers are to be dialed. In that case the stepping switch is provided with 11 positions and the code card has 11 connectors in row 31 instead of seven. Also, other styles of housings can be used for a wall telephone, for example. Also, the apparatus can be operated from an AC source rather than by battery.

Numerous other modifications should also become apparent to one skilled in the art, all of which are contemplated as falling within the spirit and scope of the present invention as defined in the appended claims.

What is claimed is:

1. A telephone dialing aid comprising:

a housing including means defining an opening for providing access to at least the dial of the telephone;

an array of indicator lights arranged so that one indicator light is associated with each position of the dial;

sequencing means capable of selectively applying energy to one indicator light at a time and capable of assuming a plurality of positions;

an actuator coupled to the sequencing means responsive to movement of the dial for advancing the sequencing means;

and means intercoupling the sequencing means and the light array and arranged to couple the energy from the sequencing means to the indicator lights of the array in a sequence as the actuator advances the sequencing means corresponding to the digits of a predetermined telephone number.

2. The telephone dialing aid of claim 1 wherein said housing includes means defining a first compartment for receiving the telephone and a second compartment for holding the sequencing means.

3. The telephone dialing aid of claim 1 wherein said array of indicator light is arranged in a circular pattern about the telephone dial.

4. The telephone dialing aid of claim 1 wherein said actuator includes a lever arm extending into the path of dialing and which is actuated each time a digit is dialed.

5. The telephone dialing aid of claim 1 wherein said sequencing means includes a stepping switch having a plurality of fixed contacts connected to the intercoupling means and a moveable contact for selectively applying energy to one of the fixed contacts.

6. The telephone dialing aid of claim 5 comprising energy storage means coupled to the moveable contact of the stepping switch.

7. The telephone dialing aid of claim 1 wherein said intercoupling means includes a two part connector coupling between the sequencing means and the light array.

8. The telephone dialing aid of claim 7 comprising a first set of fixed contacts arranged adjacent said light array and a code card having a like set of contacts which are matable with the fixed contacts and including jumper means interconnecting predetermined contacts of the code card.

9. The telephone dialing aid of claim 8 wherein the first set of fixed contacts are arranged in two groups each having a plurality of contacts, and the contacts of the code card are also arranged in two groups each having a plurality of contacts.

10. The telephone dialing aid of claim 9 wherein one group of fixed contacts and a corresponding group of code card contacts are mated, and the other group of fixed contacts and a corresponding group of code card contacts are also mated.

11. The telephone dialing aid of claim 9 wherein one group of fixed contacts and a corresponding group of code card contacts are mated, and the other group of fixed contacts and a corresponding group of code card contacts are also mated.

12. The telephone dialing aid of claim 11 wherein the first group of contacts couples to the sequencing means and the other group couples to the light array.

13. The telephone dialing aid of claim 12 wherein he fixed contacts are male prongs and the code card contacts are female eyelets.

14. The telephone dialing aid of claim 1 comprising a reset switch responsive to placement of the telephone receiver on the telephone for decoupling the energy to the stepping switch and responsive to a lifting of the telephone receiver from the telephone for coupling said energy.

15. The telephone dialing aid of claim 14 wherein said sequencing means includes a stepping switch having a sequencing plate and a reset plate and wherein said reset switch has a reset member associated therewith responsive to placement of the telephone receiver on the telephone for actuating the reset plate to reset the stepping switch to an initial position.

16. The telephone dialing aid of claim 15 wherein said actuator includes means for actuating said sequencing plate.

17. The telephone dialing aid of claim 8 comprising means for ejecting the code card from the fixed contacts.

18. The telephone dialing aid of claim 17 wherein said ejecting means includes a plate intermediate the code card and housing and means for moving the plate upwardly.

19. The telephone dialing aid of claim 1 wherein said intercoupling means include a connector card and a picture associated therewith.

20. The telephone dialing aid of claim 1 wherein said intercoupling means include a connector card and a scene associated therewith.

* * * * *